(12) United States Patent
Daoud et al.

(10) Patent No.: US 6,567,601 B2
(45) Date of Patent: May 20, 2003

(54) FIBER-OPTIC CABLE ROUTING AND MANAGEMENT SYSTEM AND COMPONENTS

(75) Inventors: Bassel Hage Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/884,511

(22) Filed: Jun. 19, 2001

(65) Prior Publication Data

US 2002/0191939 A1 Dec. 19, 2002

(51) Int. Cl.[7] .................................................. G02B 6/00
(52) U.S. Cl. ........................ 385/135; 385/134; 385/136; 385/137
(58) Field of Search ................................ 385/134, 135, 385/136, 137

(56) References Cited

U.S. PATENT DOCUMENTS

| | | | | |
|---|---|---|---|---|
| 5,074,635 A | * | 12/1991 | Justice et al. ................. | 385/95 |
| 5,208,894 A | * | 5/1993 | Johnson et al. ............. | 385/135 |
| 5,253,320 A | * | 10/1993 | Takahashi et al. .......... | 385/135 |
| 5,530,786 A | * | 6/1996 | Radliff et al. ............... | 385/136 |
| 5,835,657 A | * | 11/1998 | Suarez et al. ............... | 385/135 |
| 5,946,440 A | * | 8/1999 | Puetz ........................... | 385/135 |
| 5,978,540 A | * | 11/1999 | Bechamps et al. .......... | 385/134 |
| 6,388,824 B1 | * | 5/2002 | Treichler et al. ............ | 359/819 |

* cited by examiner

*Primary Examiner*—Michael C. Zarroli

(57) ABSTRACT

A fiber-optic cable routing management system comprising a fiber-optic splice tray rack that provides for vertical stacking of a plurality of fiber-optic splice trays to increase the density of splice trays and fiber-optic splices in a predetermined footprint. The system also comprises a fiber-optic splice tray having an integral buffer tube strain relief, and a high-density splice holder.

34 Claims, 8 Drawing Sheets

FIBER-OPTIC CABLE ROUTING AND MANAGEMENT SYSTEM AND COMPONENTS

BACKGROUND OF THE INVENTION

1. Field of the Invention

The present invention is directed to a fiber-optic cable routing and management system and components.

2. Background of the Invention

For most data and voice communications, fiber-optic cable is the preferred transmission medium. Its small size, immunity to electromagnetic interference, and bandwidth, are just a few of the reasons why fiber is preferred. At the same time, a fiber-optic cable is physically less robust than a copper-based cable. Consequently, greater care is required for splicing and installing fiber-optic cables, as compared to traditional copper-based cables.

There is also a significant push in the communications industry (both voice and data) to reduce the size of the communications equipment and to pack more equipment, interconnections, and fiber-optic cables in existing space. It is thus desirable to provide fiber-optic transmission components that protect the fiber-optic cable and splices at the junction of two cables, and that enable more fiber-optic cables to be installed in existing equipment space.

SUMMARY OF THE INVENTION

The present invention is directed to a fiber-optic cable routing management system and components. The system of the present invention comprises a fiber-optic splice tray rack and a fiber-optic splice tray having a fiber-optic splice holder. In accordance with an embodiment of the present invention, the system may include a fiber-optic splice tray rack that provides for vertical stacking of a plurality of fiber-optic splice trays to increase the density of splice trays and fiber-optic splices in a predetermined footprint. The splice tray rack includes a biasing member that automatically ejects a splice tray from the rack when the tray is selectively released. The system may also include a fiber-optic splice tray for securing and routing a plurality of fiber-optic cables and having an integral strain relief for all types of buffer tubes. A plurality of the inventive splice trays are removably placeable on the splice tray rack. The system of the present invention may also include a fiber-optic splice holder that can simultaneously accommodate mechanical splices, single fusion splices, and mass fusion or array splices. The splice holder of the present invention preferably accommodates up to twenty-four single fusion splices, and twelve mechanical or mass fusion splices in a relatively small footprint. The inventive splice holder is configured so that single fusion splices are vertically staggered (i.e., adjacent single fusion splice holders are vertically offset from each other), while mechanical or mass fusion splices are located on top of alternating single fusion splice holders. In that manner, more fiber-optic splices of various types may be accommodated by the inventive splice holder, when compared with prior art designs. The inventive fiber-optic splice holder is preferably used in connection with the inventive splice tray.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
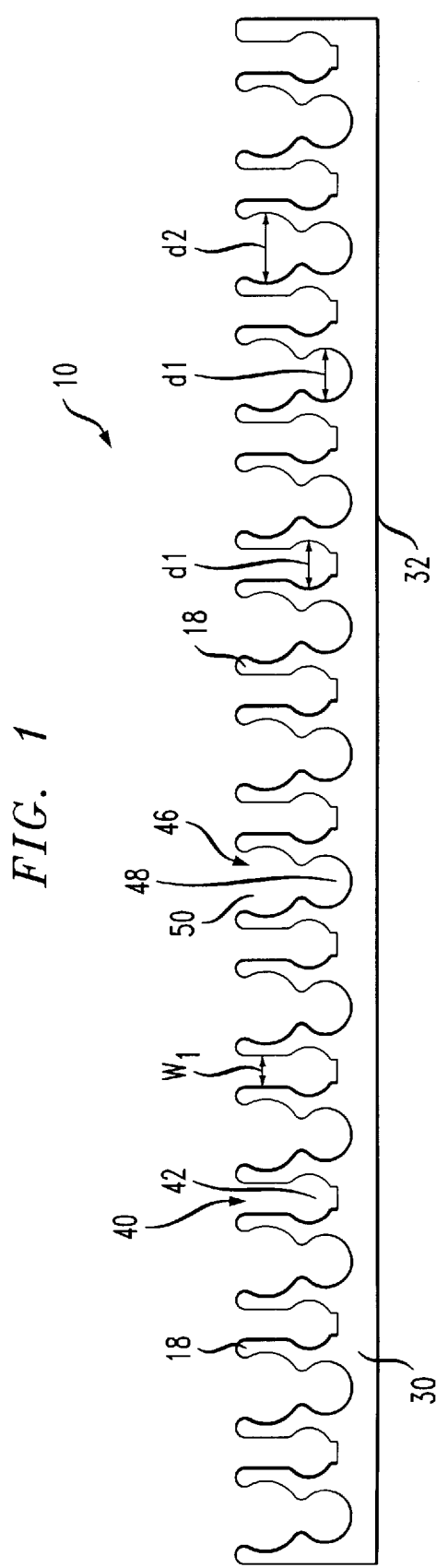
FIG. 1 is an end view of a fiber-optic splice holder constructed in accordance with an embodiment of the present invention.
Figure 2:
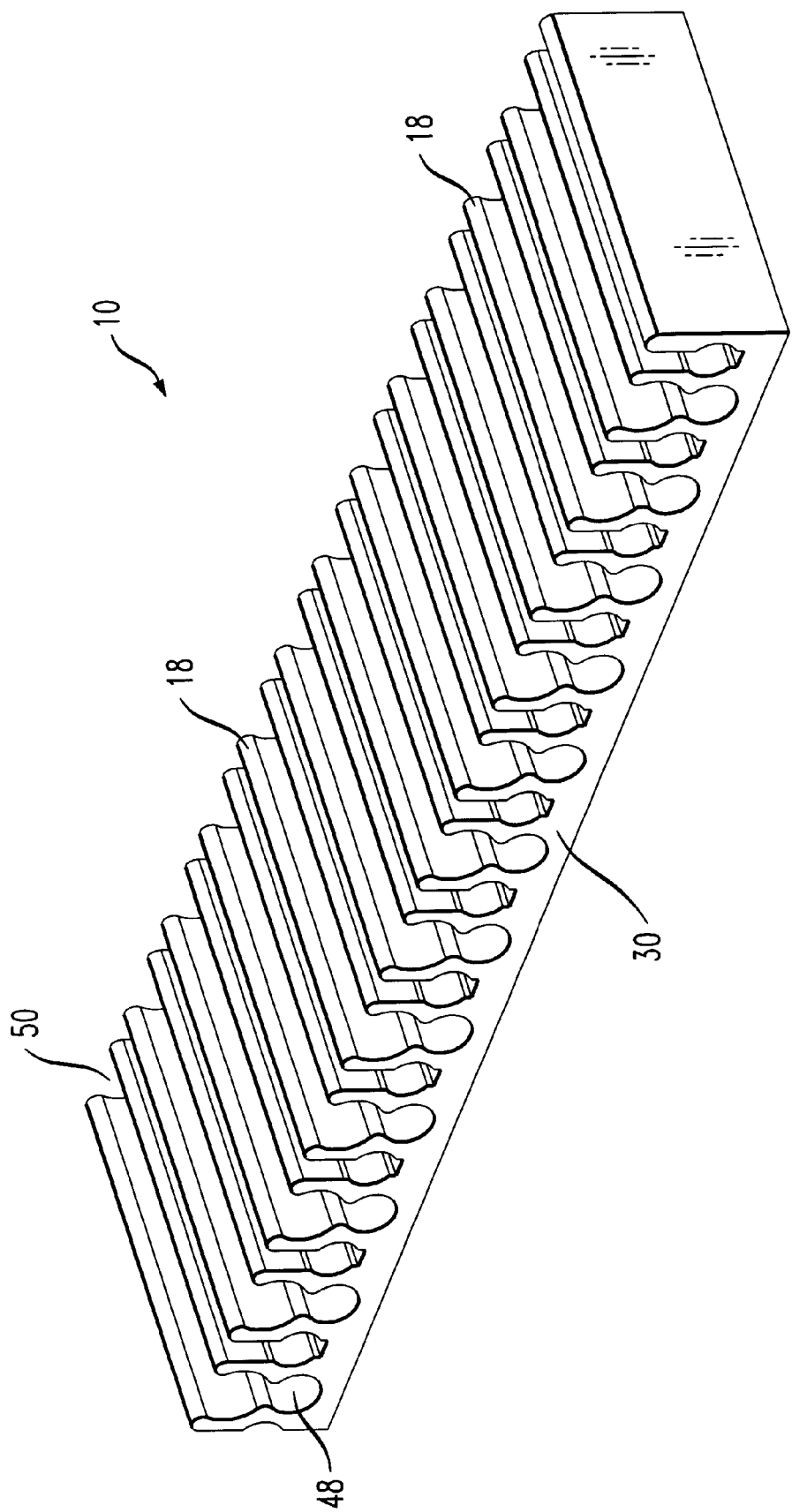
FIG. 2 is a perspective view of the splice holder of FIG. 1.
Figure 3:
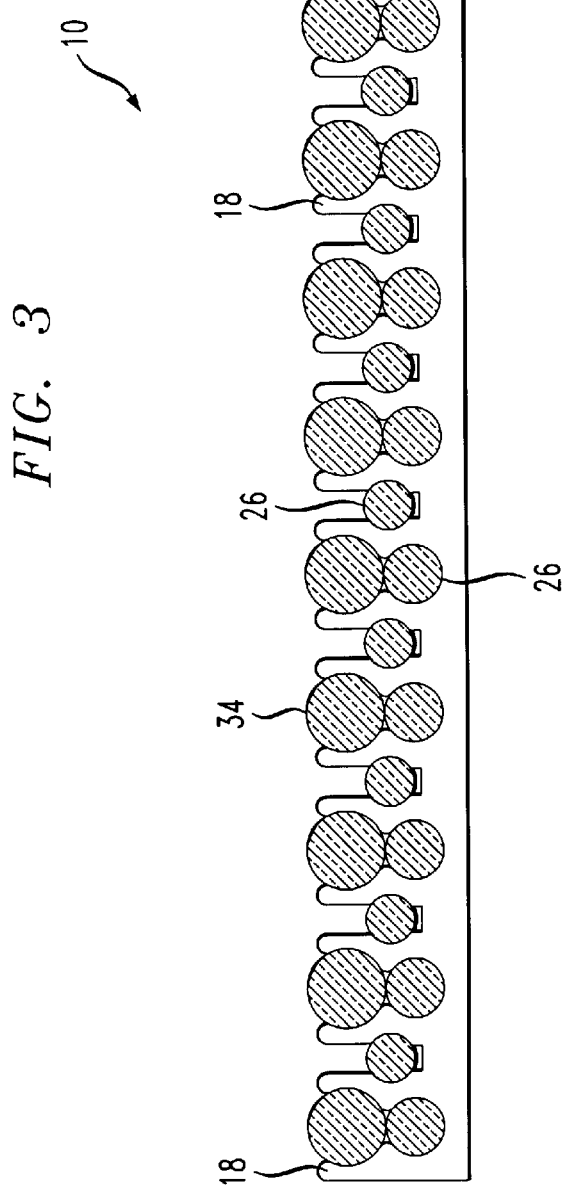
FIG. 3 is an end view of a fiber-optic splice holder constructed in accordance with an embodiment of the present invention and having a plurality of single fusion and mass fusion slices provided therein.

Referring now to the drawings in detail, the various embodiments of the present invention will now be discussed. With reference first to FIGS. 1–3, a fiber-optic splice holder constructed in accordance with an embodiment of the present invention is there depicted and generally designated by reference numeral 10. The inventive splice holder 10 can simultaneously accommodate a plurality of single fusion splices 26 and mass fusion (i.e., mechanical or array) splices 34 in a relatively small footprint. The splice holder 10 is preferably constructed of a pliable material such as, for example, polypropylene, and a base 30 having a longitudinal A dimension of preferably equal to or less than approximately 3.3 inches. A plurality of single channels 40 and double channels 46 are defined in the base 30 transverse to the longitudinal dimension of the base 30 (see, e.g., FIG. 2). Each single channel 40 has an inner diameter d1 sufficient to accommodate and securely hold a single fusion splice 26. In a preferred embodiment, inner diameter d1 ranges from approximately 0.1 inch to 0.12 inch. Each double channel 46 has a first inner diameter d1 that is preferably the same diameter as the single channel 40, and a second inner diameter d2 sufficient to accommodate and securely hold a mass fusion splice 34. In a preferred embodiment, second inner diameter d2 ranges from approximately 0.16 inch to 0.19 inch and the shape of the second diameter is generally oval. A plurality of splice holding arms 18 extend generally upward from the base 30 and separate and define the plurality of single channels 40 and double channels 46.

The single channel 40 and an adjacently positioned double channel 46 are arranged so that the inner diameter d1 of each channel 40, 46 are vertically offset with respect to each other. That arrangement provides for maximum fiber splice density across the splice holder 10. That arrangement also ensures that the width of a mass fusion splice 34 (as generally defined by its cross-sectional diameter) does not prevent placement of a single fusion splice 26 in a single channel 40 directly adjacent to that in which the mass fusion splice 34 is provided. The placement of the mass fusion splice 34 with respect to a single fusion splice 26 (i.e., either above or adjacent) also secures the single fusion splice 26 in place. The second inner diameter d2 of the double channel 46 is sufficient to securely hold a mass fusion splice 34 in place in the double channel 46. A single fusion splice 26 located below the mass fusion splice 34 in the double channel 46 will be held securely in place by the mass fusion splice 34. The single fusion splice 26 is also held in place in a single channel 40 by the mass fusion splices 34 provided in the double channels 46 on both sides of the single channel 40 within which the single fusion splice 26 is provided. If either or both of the double channels 46 adjacent a single channel 40 do not contain a mass fusion splice 34, the diameter d1 of the single channel 40 is sufficient to accommodate and securely hold the single fusion splice 26 within the single channel 40.

The splice holder 10 of the present invention may be used in connection with a fiber optic splice tray such as are described below, for example, or with any other fiber-optic cable routing and storage device. In a preferred embodiment, a surface 32 of the base 30 may be adhesive (e.g., adhesive substance, double-sided tape, etc.) to facilitate securing the splice holder 10 to the tray or other routing and storage device. Alternatively, the base 30 may include protuberances or other structure to facilitate securing the splice holder 10 in place. Other securement means may also be provided, as a routine matter of design choice.

Figure 4:
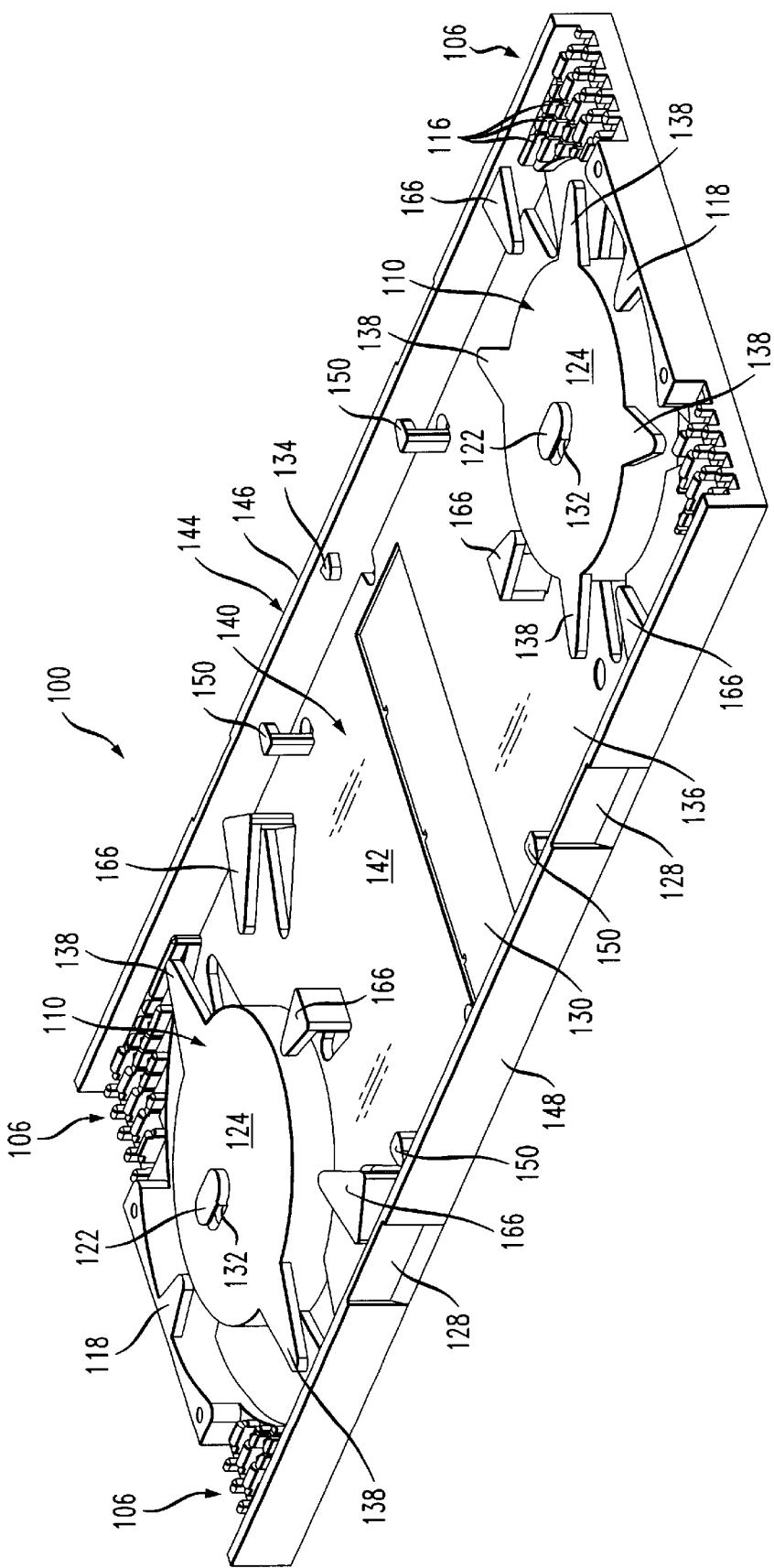
FIG. 4 is a perspective view of a fiber-optic splice tray constructed in accordance with an embodiment of the present invention.
Figure 5:
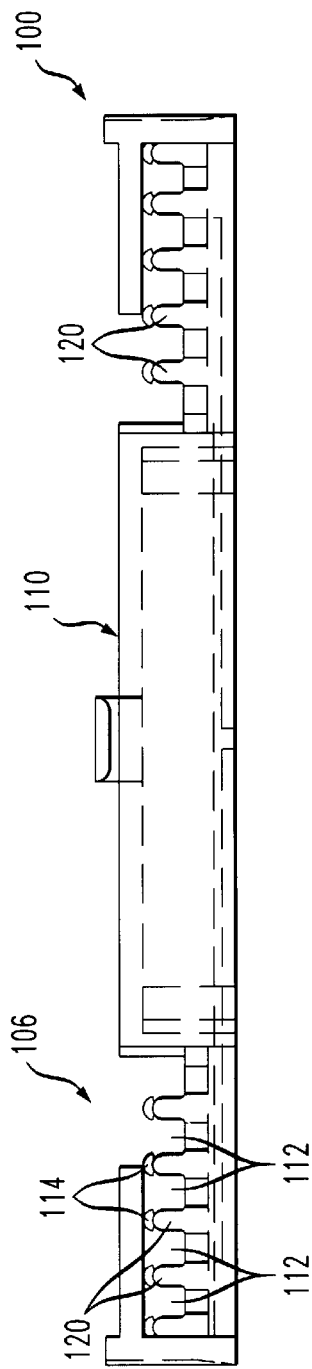
FIG. 5 is an end view of the splice tray of FIG. 4.
Figure 6:
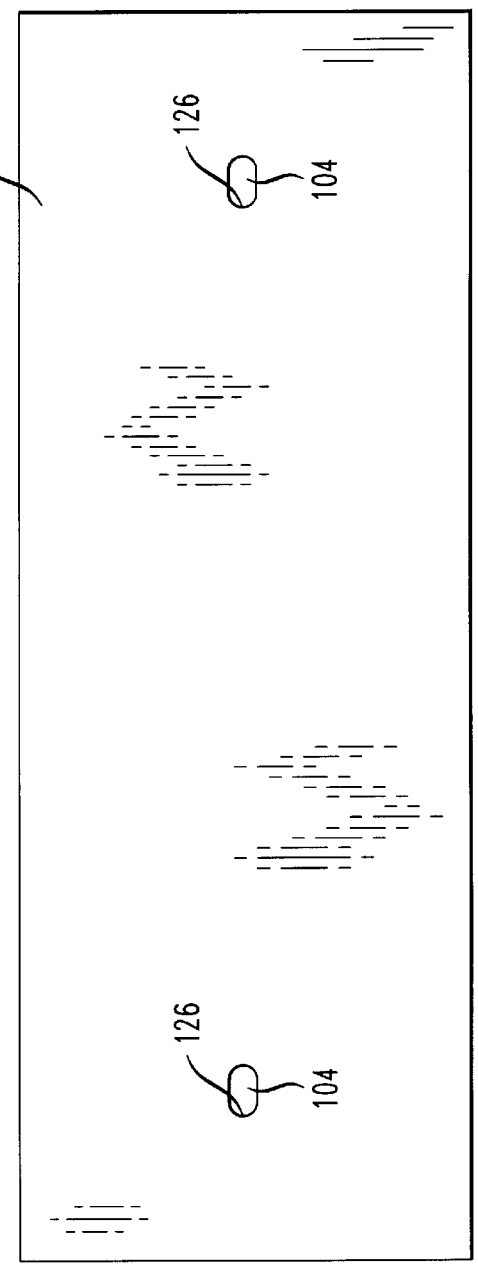
FIG. 6 is a top plan view of a removable top for the splice tray of FIG. 4.
Figure 7:
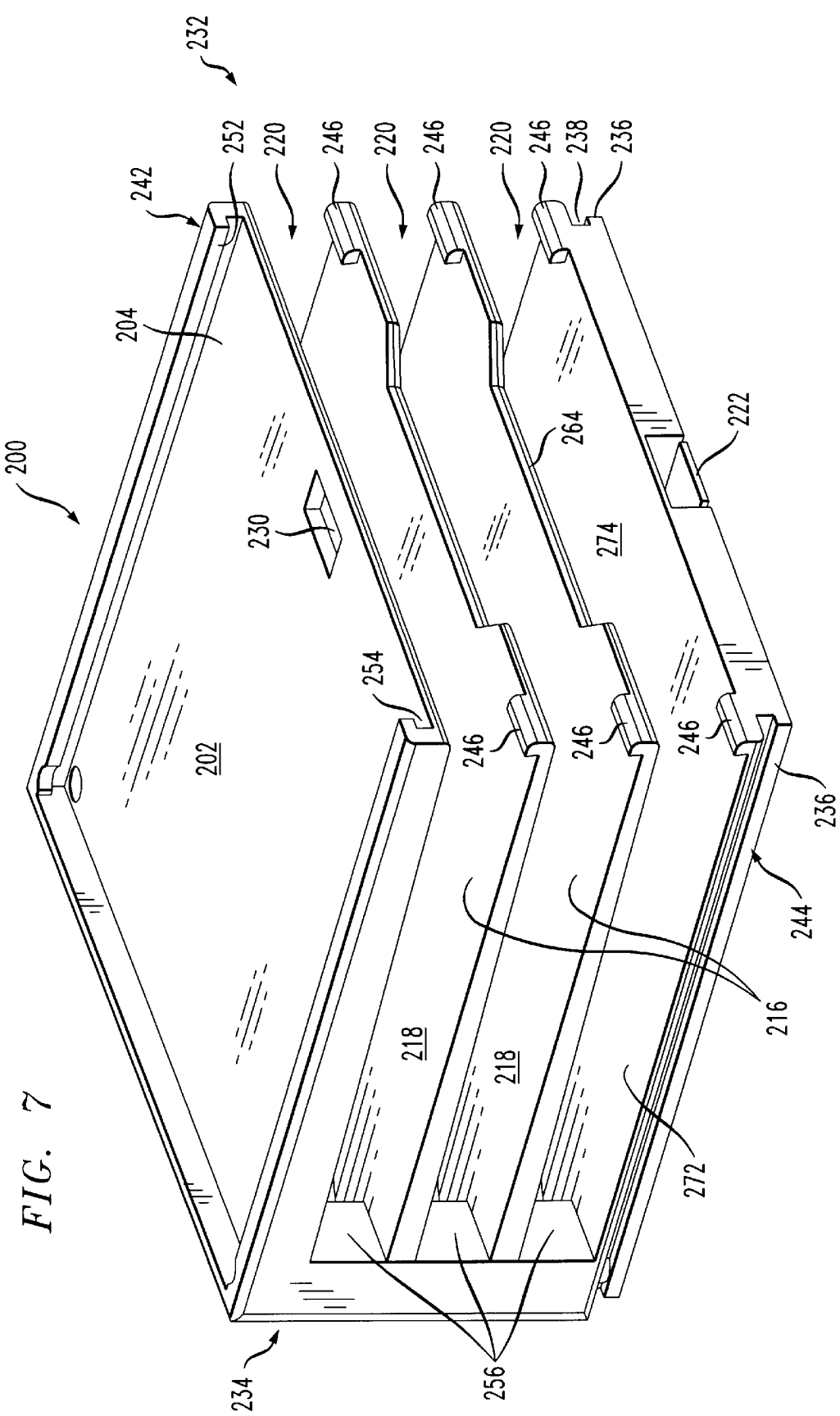
FIG. 7 is a perspective view of a fiber-optic splice tray rack constructed in accordance with an embodiment of the present invention.

Referring next to FIGS. 4–6, a fiber-optic splice tray constructed in accordance with an embodiment of the present invention is generally designated by reference numeral 100 and will now be discussed in detail. The splice tray 100 provides for routing and management of a plurality of fiber-optic cables (not shown) and is typically used in connection with a splicing enclosure, optical interconnection unit, optical enclosures and closures, optical cross-connect units, buried optical enclosures, and the like (not shown), which are generally known to persons skilled in the art and thus need not be described in detail in this application. The splice tray 100 may be constructed of generally rigid plastic, as a matter of design choice. The splice tray 100 includes a base 144 having a bottom 136 and two walls 146, 148 extending generally upward therefrom and longitudinally therealong to define a fiber-optic cable routing and storage channel 140 within which a plurality of fiber-optic cables may be routed and stored. The splice tray 100 also includes two slack storage reels 110 that each define an arcuate part of a cable routing path of the tray 100. The two slack storage reels 110 are located at longitudinally opposite ends of the base 144 and extend generally upward from the bottom 136. Each reel 110 has a top surface 124 from which a plurality of fingers 138 extend radially outward. The fingers 138 guidingly secure a fiber-optic cable in place as it is routed about each reel 110 and along the arcuate part of the cable routing path. A retainer finger 118 extends from each end of the base 144 toward the proximately located slack storage reel 110. The retainer finger 118 together with the fingers 138 keep the fiber-optic cable in place around the reel 110 and in the routing path. Cable routing and storage is also facilitated by a plurality of cable guides 150 provided along each wall 146, 148 and in spaced apart relation thereto, and by cable guides 166 provided near each reel 110, which provide an additional and complementary cable guide to the fingers 138.

The cable routing path may follow virtually any path on the tray 100, utilizing the cable guides 150, 166 and slack storage reels 110 as needed to route a fiber-optic cable on and along the tray 100.

A cover locking tab 122 extends upward from the top surface 124 of each reel 110, and is sized and shaped to fit in a locking aperture 104 defined through a cover 102 (see, e.g., FIG. 6) for the splice tray 100. The cover 102 protects fiber-optic cables and splice connections in the tray 100 against exposure to dust and damage. To install the cover 102 on the tray 100, the locking apertures 104 are aligned with the locking tabs 122, and the cover 102 is lowered onto the top surface 124 of the slack storage reels 110 (and other supporting parts, e.g., cable guides 150, 166, and fingers 138) and cover support tabs 134 and slid thereon until an end 126 of the locking apertrue 104 encounters a complementarily sized and shaped part 132 of the locking tabs 122.

A recess 130 is defined in the bottom 136 of the base 144 and is sized and shaped to accommodate a fiber-optic splice holder (not shown in FIG. 4). Alternatively, an aperture may be defined through the base 144 and may be sized and shaped to accommodate a fiber-optic splice holder (not shown in FIG. 4). An exemplary fiber-optic splice holder that may be used in connection with the tray 100 and recess 130 is depicted in FIGS. 1–3 and is generally designated by reference numeral 10 herein. Alternative embodiments of a splice holder may also be used in connection with the splice tray 100 of the present invention, as a matter of design choice.

The inventive splice tray 100 also includes a buffer tube strain relief 106 located at an end of the base 144, and preferably a strain relief 106 on either side of each slack storage reel 110 and at longitudinally opposite ends of the base 144. In a preferred embodiment, four buffer tube strain reliefs 106 are provided and are unitarily formed with the base 144. With continued reference to FIG. 4 and additional reference to FIG. 5, the buffer tube strain relief 106 of the present invention will now be discussed in detail. While the following discussion is directed to one of the four strain reliefs 106 depicted in FIG. 4, that discussion applies equally to each strain relief 106, unless indicated to the contrary. The buffer tube strain relief 106 of the present invention includes a plurality of generally parallel channels 112 which can each accommodate a single buffer tube (not shown). Each channel 112 is generally defined by two channel walls 120 that extend generally upward from the base bottom 136 and that each have a cap retainer 114 to secure the buffer tube in place in the channel 112. A plurality of ridge retainers 116 (see, e.g., FIG. 4) are defined on each channel wall 120 and are oriented generally perpendicular to the base bottom 136. The ridge retainers 116 also help to secure the buffer tube in place in the channel 112. While four channels 112 are depicted on each side of the slack storage reel 110 (and at each end of the base 144), more or less channels 112 may be provided, as a routine matter of design choice. Also, the configuration of the cap retainer 114 and ridge retainer 116 may be varied and still secure the buffer tube in place in the channel 112, provided that the cap retainer 114 and ridge retainer 116 function, either separately or together, to secure the buffer tube in the channel 112. When installed in the splice tray 100, the top 102 (see, e.g., FIG. 6) provides additional securement of a buffer tube in the channel 112.

A splice tray 100 constructed in accordance with the above-described embodiment of the present invention eliminates the need to provide separate securement means (e.g., cable ties) to secure the buffer tube and fiber-optic cable in place and to the tray 100.

With reference next to FIGS. 7–10, and with continued reference to FIG. 4, a fiber-optic splice tray rack constructed in accordance with an embodiment of the present invention is depicted and generally identified by reference numeral 200. The inventive splice tray rack 200 is sized, shaped and configured to stackingly hold (in a generally vertical orientation) a plurality of fiber-optic splice trays, such as are depicted in FIG. 4, for example. It will be obvious to persons skilled in the art and from the disclosure provided herein that other splice tray designs and constructions may be used in connection with the splice tray rack 200 of the present invention, as a routine matter of design choice. The splice tray rack 200 includes a top 204 having a top surface 202, and a base 272 having a base surface 274. A plurality of vertically spaced-apart trays 216, each having a tray surface 218, are provided. A front 236 of the rack 200 is generally open, and a rear 238 of the rack 200 is generally closed. A plurality of tray channels 220, each for receiving a fiber-optic splice tray, are defined between the top 204 and the bottom 272. A single fiber-optic splice tray may be placed in each tray channel 220, and removed as described in more detail below. Two front stops 246 are provided on each tray 216 to releasably secure a fiber-optic splice tray in place on the tray 216 and in the splice tray rack 200. Alternatively, a single front stop 246 may be provided.

A plurality of splice tray racks 200 may be stacked on top of each other to provide for a higher concentration of fiber-optic splices, cable routing, and cable storage than currently available. The splice tray rack 200 of the present invention includes a top mount 242 comprised of a top mating rail 252 and a top mating channel 254 provided on opposite sides of the top 204. The splice tray rack 200 also includes a bottom mount 244 comprised of a bottom mating rail 236 and a bottom mating channel 238 provided on opposite sides of the base 272. The top mount 242 and bottom mount 244 are complementarily sized and shaped so as to slidingly fit together to provide vertical stacking of a plurality of splice tray racks 200. The bottom mating rail 236 is sized and shaped to slidingly fit in the top mating channel 254, and the bottom mating channel 238 is sized and shaped to slidingly receive the top mating rail 252. A locking aperture 230 is defined through the top 204 and sized and shaped to receive a locking tab 222 provided as part of the base 272. It will be obvious to persons skilled in the art and from the disclosure provided herein that alternative embodiments of the aperture 230 and locking tab 222 may be provided as part of the splice tray rack 200, provided that such alternative embodiments enable the slidingly locking and releasable engagement of a first and second splice tray rack 200.

Figure 8:
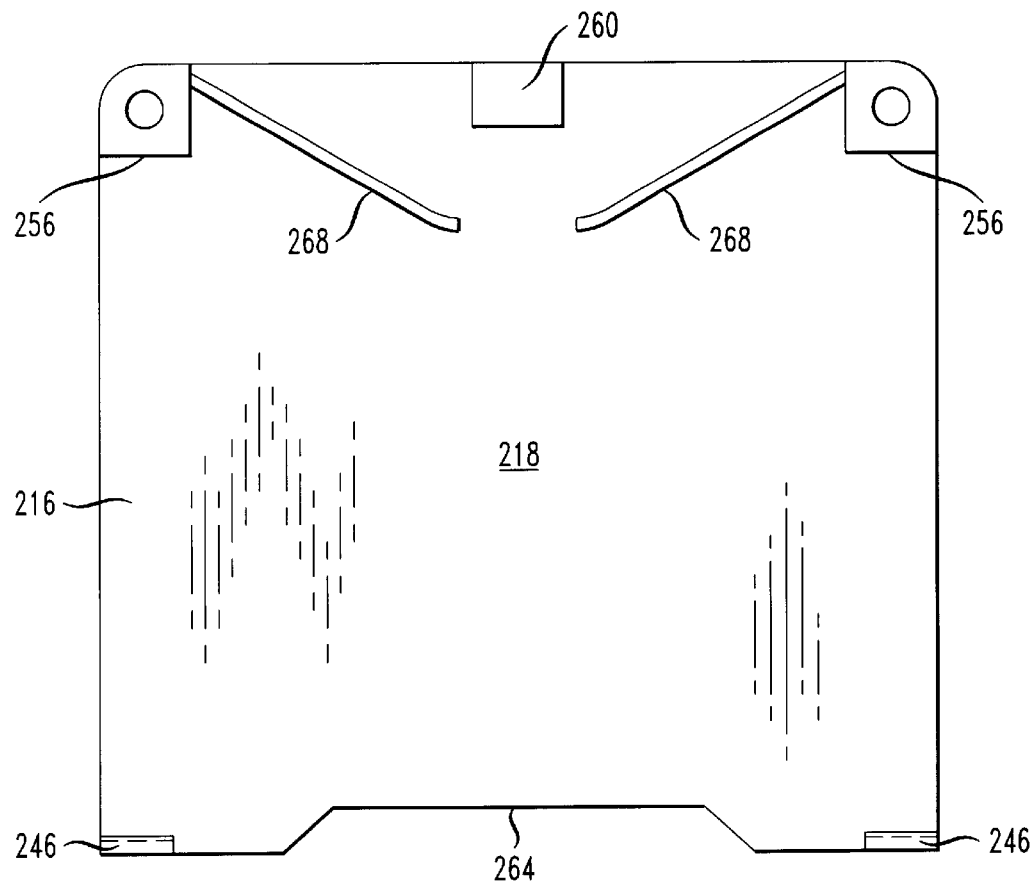
FIG. 8 is a top plan view of the splice tray rack of FIG. 7, with a top part of the rack removed.
Figure 9:
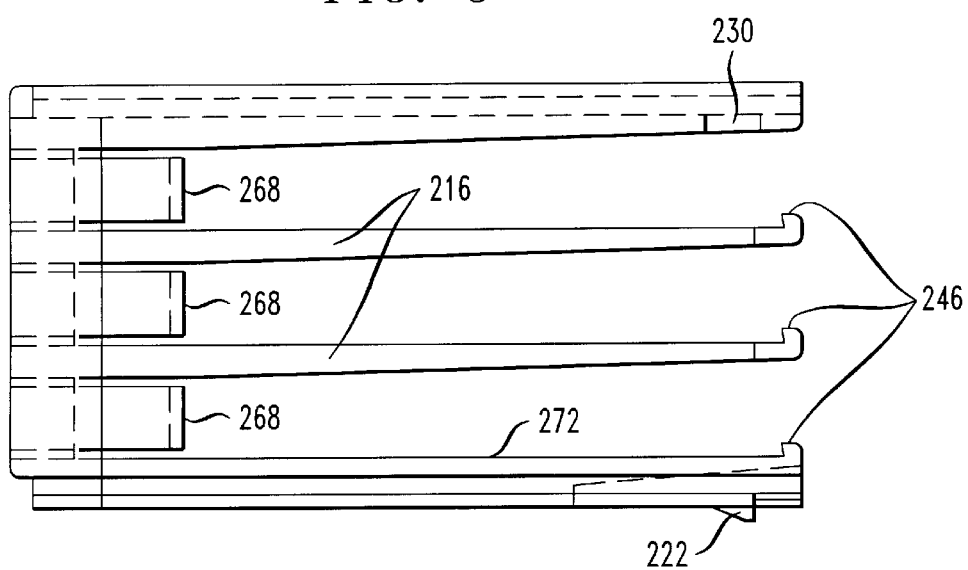
FIG. 9 is a side view of the splice tray rack of FIG. 7.

Referring next to FIG. 8, the inventive splice tray rack 200 is depicted with the top 204 removed for clarity and each of discussion. Each tray 216 and the base 272 have two ejection springs 268 that automatically eject a splice tray 100 when manually released from the front stop 246. In operation, a splice tray 100 is inserted in a tray channel 220 and caused to pass over the front stops 246, until a surface of the tray 100 encounters a rear stop 256. Preferably, the distance between the rear stop 256 and front stops 246 is approximately the same size as the width of the tray 100. The ejection springs 268 are biased so as to encourage the tray 100 into contacting engagement with the front stops 246.

The tray 100 is thus held in the tray channel 220 by the combination of the ejection springs 268 and front stops 246. In addition, the height of the tray channel 220 is preferably tapered from front to rear (i.e., from the front stops 246 to the rear stop 268), decreasing from front to rear to a height just slightly greater than the height of the splice tray 100. The tapered configuration of the tray channel 220 facilitates easy insertion and removal of the splice tray 100 to and from the channel 220, while securely holding the splice tray 100 in place within the channel 220. The splice tray rack 200 of the present invention may be unitarily constructed or alternatively, constructed of a plurality of piece-parts, as a routine matter of design choice. Similarly, the ejection springs 268 may be unitarily constructed with the splice tray rack 200, or constructed separately of plastic, metal (e.g., spring steel) or other flexible material.

Figure 10:
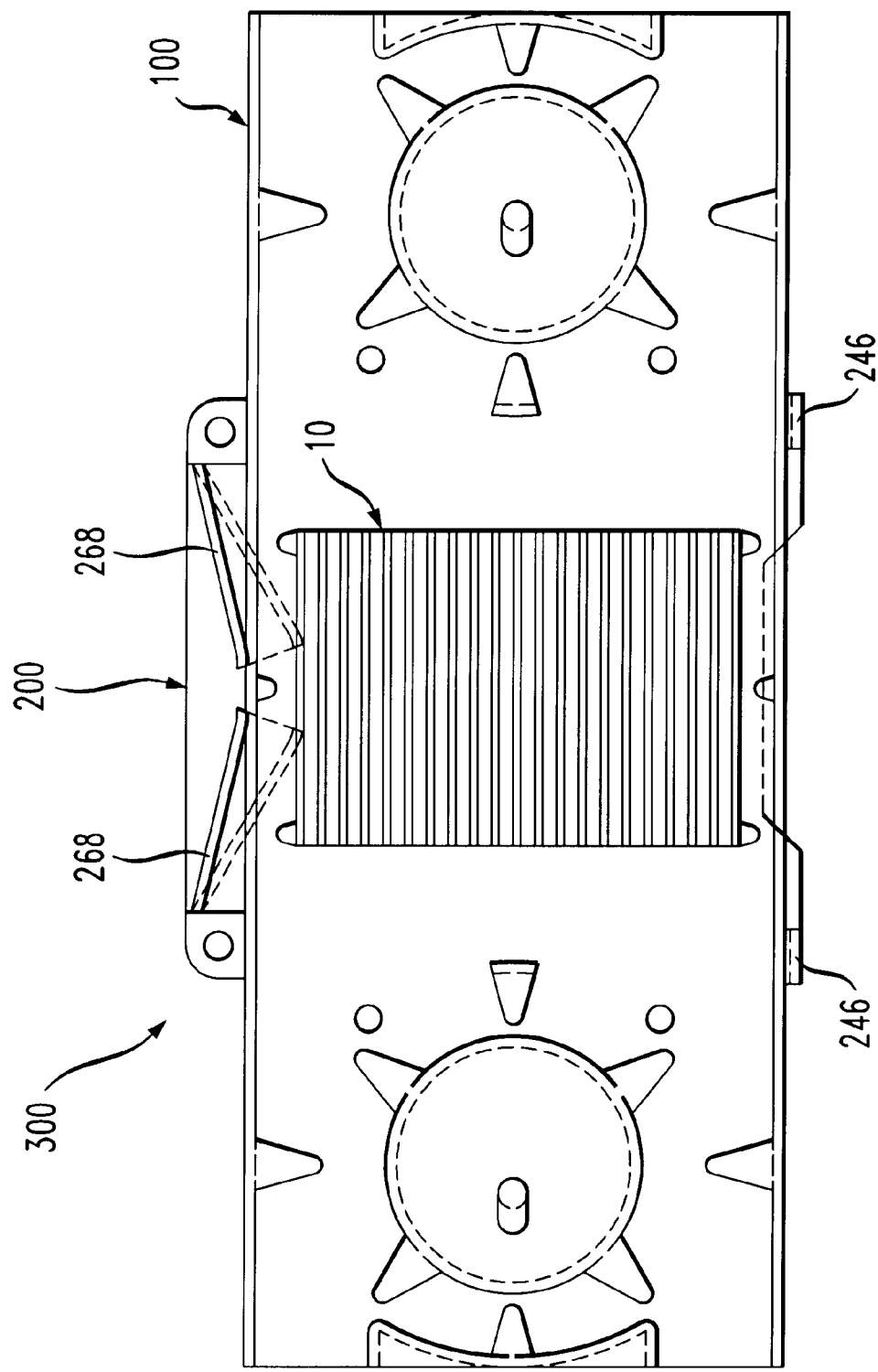
FIG. 10 is a plan view of the splice tray rack of FIG. 7 holding a fiber-optic splice tray.

Referring next to FIG. 10, a fiber-optic cable routing and management system in accordance with the present invention is there depicted and generally designated by reference numeral 300. The splice system 300 comprises a fiber-optic splice tray rack 200 and a fiber-optic splice tray 100 having a fiber-optic splice holder 10. The system 300 depicted in FIG. 10 includes a somewhat generic fiber-optic splice tray (certain features of the inventive splice tray 100 depicted in FIG. 4 are not shown in FIG. 10) is held in place by a splice tray rack 200 constructed in accordance with an embodiment of the present invention, as described in detail above. The splice tray 100 is held in place in the splice tray rack 200 by the combination of the front stops 246, rear stops 256, and ejection springs 268. To facilitate removing the splice tray 100 from the rack 200, a gripping indenture 264 is defined in a front of each tray 216. Using a finger or other suitable tool, a user may pop the splice tray 100 up, causing the tray 100 to be released by the front stops 246 and ejected by the ejection springs 268.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A fiber-optic splice holder comprising:
    a base having defined therein a single channel and a double channel, said single channel and said double channel each having a curved cross section shaped to securely hold at least one fiber-optic cable,
    said single channel having a first inner diameter sized and shaped to hold a single fusion splice of a first fiber-optic cable,
    said double channel having a first inner diameter to hold a single fusion splice of a second fiber-optic cable, and having a second inner diameter sized and shaped to hold a mass fusion splice of a third fiber-optic cable,
    said first inner diameter of said single channel and said first inner diameter of said double channel being vertically offset with respect to each other,
    wherein said second inner diameter is greater than said first inner diameter of said double channel, and wherein said first inner diameter of said double channel is located below said second inner diameter of said double channel.

2. A fiber-optic splice holder as recited b claim 1, wherein said base has a longitudinal dimension and wherein said single channel and said double channel are defined in said base generally transverse to said longitudinal dimension.

3. A fiber-optic splice holder as recited by claim 2, wherein said longitudinal dimension is approximately equal to 3.3 inches.

4. A fiber-optic splice holder as recited by claim 1, wherein said base is constructed of a pliable material.

5. A fiber-optic splice holder as recited by claim 1, wherein said base has a generally adhesive surface for securing said holder to a structure.

6. A fiber-optic splice tray for routing of a plurality of fiber-optic cables over a cable routing path, said splice tray having a longitudinal dimension and comprising:
   a base having a first end and a second end located longitudinally opposite of the first end; and
   a first buffer tube strain relief located at one of the first and second end of said base for holding a first buffer tube, the first buffer tube strain relief having a plurality of channel walls extending perpendicular to said base, each channel wall having at least one of the group consisting of a ridge retainer and a cap retainer thereon.

7. A fiber-optic splice tray as recited by claim 6, further comprising a second buffer tube strain relief located at the one of the first and second end of said base for holding a second buffer tube.

8. A fiber-optic splice tray as recited by claim 7, further comprising a third buffer tube strain relief located at the other one of the first and second end of said base for holding a third buffer tube.

9. A fiber-optic splice tray as recited by claim 8, further comprising a fourth buffer tube strain relief located at the other one of the first and second end of said base for holding a fourth buffer tube.

10. A fiber-optic splice tray as recited by claim 9, wherein said first, second, third and fourth buffer tube strain reliefs are unitarily formed with said base.

11. A fiber-optic splice tray as recited by claim 6, said splice tray further comprising:
   a first slack storage reel located at said first end and defining a first arcuate part of the cable routing path; and
   a second slack storage reel located at said second end and defining a second arcuate part of the cable routing path.

12. A fiber-optic splice tray as recited by claim 11, wherein said first and said second slack storage reels each have a top surface having a plurality of fingers extending radially outward therefrom.

13. A fiber-optic splice tray as recited by claim 6, further comprising:
   a first wall extending generally upward from said base and longitudinally therealong; and
   a second wall extending generally upward from said base and longitudinally therealong, said second wall being spaced apart from said first wall in a direction transverse to the longitudinal direction;
   said first wall and said second wall defining a fiber-optic cable routing and storage channel.

14. A fiber-optic splice tray as recited by claim 13, further comprising a plurality of cable guides provided on said base.

15. A fiber-optic splice tray for routing of a plurality of fiber-optic cables over a cable routing path, said splice tray having a longitudinal dimension and comprising:
   a base having a first end and a second end located longitudinally opposite of the first end;
   a first slack storage reel located at said first end and defining a first arcuate part of the cable routing path;
   a second slack storage reel located at said second end and defining a second arcuate part of the cable routing path;
   a locking tab extending upward from a top surface of each of said first and said second slack storage reel; and
   a cover having a locking aperture defined therethrough for each said locking tab.

16. A fiber-optic splice tray rack for holding a plurality of fiber-optic splice trays in vertically stacked relation to each other, said splice tray rack comprising:
   a base having a first and second side;
   a plurality of trays vertically spaced apart from said base and from each other to define a plurality of tray channels, each tray channel being sized and shaped to accommodate a fiber-optic splice tray;
   a top located above said plurality of trays and having a first and second side; and
   ejection springs for each tray channel for ejecting a fiber-optic splice tray from said each tray channel.

17. A fiber-optic splice tray rack for holding a plurality of fiber-optic splice trays in vertically stacked relation to each other, said splice tray rack comprising:
   a base having a first and second side;
   a plurality of trays vertically spaced apart from said base and from each other to define a plurality of tray channels, each tray channel being sized and shaped to accommodate a fiber-optic splice tray;
   a top located above said plurality of trays and having a first and second side;
   an ejector for each tray channel for ejecting a fiber-optic splice tray from said each tray channel; and
   a front stop defined on each of said plurality of trays for securing a fiber-optic splice tray on said tray and in said tray channel.

18. A fiber-optic splice tray rack for holding a plurality of fiber-optic splice trays in vertically stacked relation to each other, said splice tray rack comprising:
   a base having a first and second side;
   a plurality of trays vertically spaced apart from said base and from each other to define a plurality of tray channels, each tray channel being sized and shaped to accommodate a fiber-optic splice tray;
   a top located above said plurality of trays and having a first and second side;
   an ejector for each tray channel for ejecting a fiber-optic splice tray from said each tray channel;
   a top mount defined in said top; and
   a bottom mount defined in said base and complementarily sized and shaped to said top mount, said top mount and said bottom mount facilitating sliding engagement of said fiber-optic splice tray rack and another fiber-optic splice tray rack.

19. A fiber-optic splice tray rack as recited by claim 18, wherein said top mount further comprises:
   a top mounting rail defined on each side of said top;
   a top mounting channel defined on each side of said top;
   a bottom mounting rail defined on each side of said base; and
   a bottom mounting channel defined on each side of said base.

20. A fiber-optic splice tray rack for holding a plurality of fiber-optic splice trays in vertically stacked relation to each other, said splice tray rack comprising:
   a base having a first and second side;

a plurality of trays vertically spaced apart from said base and from each other to define a plurality of tray channels, each tray channel being sized and shaped to accommodate a fiber-optic splice tray;

a top located above said plurality of trays and having a first and second side;

an ejector for each tray channel for ejecting a fiber-optic splice tray from said each tray channel;

a locking aperture defined through said top; and a locking tab provided as part of said base and being complementarily sized and shaped to said locking aperture.

21. A fiber-optic cable routing and management system comprising:

a fiber-optic splice tray rack comprising:
  a base having a first side and a second side;
  a plurality of trays vertically spaced apart from said base and from each other to define a plurality of tray channels, each tray channel being sized and shaped to accommodate a fiber-optic splice tray;
  a top located above said plurality of trays and having a first side and a second side; and
  an ejector for each tray channel for ejecting a fiber-optic splice tray from said each tray channel;

a fiber-optic splice tray comprising:
  a base having a first end and a second end located longitudinally opposite of the first end; and
  a first buffer tube strain relief located at one of the first and second end of said base for holding a first buffer tube; and a fiber-optic splice holder comprising a base having defined therein a single channel and a double channel, said single channel having a first inner diameter sized and shaped to hold a single fusion splice of a first fiber-optic cable, said double channel having a first inner diameter to hold a single fusion splice of a second fiber-optic cable, and having a second inner diameter sized and shaped to hold a mass fusion splice of a third fiber-optic cable, said first inner diameter of said single channel and said first inner diameter of said double channel being vertically offset with respect to each other.

22. A fiber-optic cable routing and management system as recited by claim 21, wherein said fiber-optic splice tray rack further comprises a front stop defined on each of said plurality of trays for securing a fiber-optic splice tray on said tray and in said tray channel corresponding to said tray.

23. A fiber-optic cable routing and management system as recited by claim 21, wherein said fiber-optic splice tray rack further comprises:

a top mount defined in said top; and a bottom mount defined in said base and complementarily sized and shaped to said top mount, said top mount and said bottom mount facilitating sliding engagement of said fiber-optic splice tray rack and another fiber-optic splice tray rack.

24. A fiber-optic cable routing and management system as recited by claim 23, wherein said top mount further comprises:

a top mounting rail defined on each side of said top;

a top mounting channel defined on each side of said top;

a bottom mounting rail defined on each side of said base; and a bottom mounting channel defined on each side of said base.

25. A fiber-optic cable routing and management system as recited by claim 21, wherein said fiber-optic splice tray rack further comprises:

a locking aperture defined through said top; and a locking tab provided as part of said base and being complementarily sized and shaped to said locking aperture.

26. A fiber-optic cable routing and management system as recited by claim 21, wherein said fiber-optic splice tray comprises a second buffer tube strain relief located at the one of the first and second end of said base for holding a second buffer tube.

27. A fiber-optic cable routing and management system as recited by claim 21, wherein said fiber-optic splice tray comprises a third buffer tube strain relief located at the other one of the first and second end of said base for holding a third buffer tube.

28. A fiber-optic cable routing and management system as recited by claim 27, wherein said fiber-optic splice tray further comprises a fourth buffer tube strain relief located at the other one of the first and second end of said base for holding a fourth buffer tube.

29. A fiber-optic cable routing and management system as recited by claim 28, wherein said first, second, third and fourth buffer tube strain reliefs are unitarily formed with said base.

30. A fiber-optic cable routing and management system as recited by claim 21, said fiber-optic splice tray further comprises:

a first slack storage reel located at said first end and defining a first arcuate part of the cable routing path; and a second slack storage reel located at said second end and defining a second arcuate part of the cable routing path.

31. A fiber-optic cable routing and management system as recited by claim 30, wherein said first and said second slack storage reels each have a top surface having a plurality of fingers extending radially outward therefrom.

32. A fiber-optic cable routing and management system as recited by claim 21, wherein said fiber-optic splice tray further comprises:

a first wall extending generally upward from said base and longitudinally therealong; and a second wall extending generally upward from said base and longitudinally therealong, said second wall being spaced apart from said first wall in a direction transverse to the longitudinal direction;

said first wall and said second wall defining a fiber-optic cable routing and storage channel.

33. A fiber-optic cable routing and management system as recited by claim 32, wherein said fiber-optic splice tray further comprises a plurality of cable guides provided on said base.

34. A fiber-optic cable routing and management system as recited by claim 30, wherein said fiber-optic splice tray further comprises:

a locking tab extending upward from a top surface of each of said first and said second slack storage reel; and a cover having a locking aperture defined therethrough for each said locking tab.

* * * * *